350-96.24
E197A XR 3,517,386
350 - 96.24

VISUAL PATTERN RECOGNITION SYSTEM

Filed Sept. 7, 1966

INVENTOR.
JAMES W. JONES
BY Kenneth L. Lombardo
ATTORNEY

3,517,386
VISUAL PATTERN RECOGNITION SYSTEM

James W. Jones, Granada Hills, Calif., assignor to International Telephone and Telegraph Corporation, Nutley, N.J., a corporation of Maryland Filed Sept. 7, 1966, Ser. No. 577,710
Int. Cl. G06k 7/00, 9/00; G01n 21/30
U.S. Cl. 340—146.3 3 Claims

ABSTRACT OF THE DISCLOSURE

An analog transformation device making use of a raster onto which a visual pattern to be recognized is projected, a fiber optic converter for translating a two dimensional image pattern from the raster to a vertical linear display, and a photographic film attenuation filter for imposing a predetermined attenuation function on light transmitted from the vertical linear display to a horizontal array of sensors.

This invention relates to a visual pattern recognition system, and more particularly to apparatus for instrumenting a visual pattern recognition system such as described in my copending U.S. patent application entitled "Adaptive Speech Pattern Recognition System," Ser. No. 772,631, filed Nov. 1, 1968.

This new and novel technique for instrumenting a visual pattern recognition system is based on the "Adapted Pattern Recognition System" as disclosed in the copending application of J. W. Jones, Ser. No. 525,921, filed Feb. 8, 1966 now abandoned. As such, the system should be capable of recognizing visual patterns that have been distorted in a variety of ways, for example, rotation, enlargement, shifting, and deformation. At the same time, the apparatus proposed is extremely simple and can be implemented with a minimum number of elements.

Therefore, a primary object of this invention is to provide apparatus for a visual pattern recognition system which is capable of recognizing visual patterns that have been distorted in a variety of ways.

Another object of this invention is to describe apparatus for instrumenting a visual pattern recognition system which is extremely simple and can be implemented with a number of elements.

A feature of this invention is that it involves a sequence of two operations. The input is first operated upon by a preprocessing unit to produce a representative set of values or properties. This set of values is then operated upon by a classification unit to produce a decision that the input is a member of one of a set of input classes.

Figure 1A:
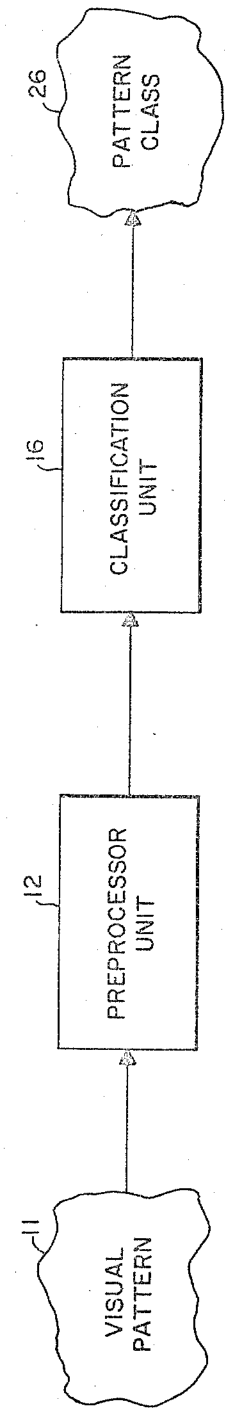
Figure 1B:
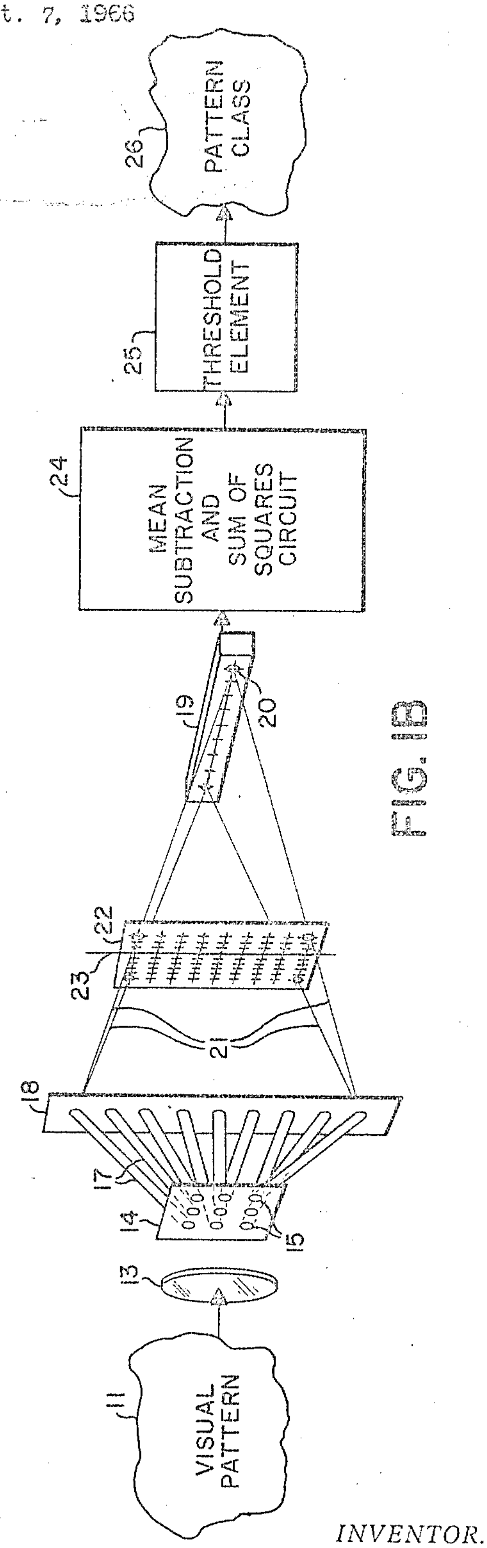

The above-mentioned and other features and objects of this invention will become more apparent by reference to the following description taken in conjunction with the accompanying drawing, in which:

FIG. 1A illustrates the basic operation of a visual pattern recognition system; and FIG. 1B illustrates the apparatus for instrumenting the visual pattern recognition system according to the invention.

Referring now to the drawing, in most pattern recognition problems one has far more information existing about the pattern than is convenient to use or practicable to abstract automatically. The reduction of the visual pattern 11 to a manageable proportion is called preprocessing, and is indicated by preprocessor unit 12. In the proposed system, the preprocessing unit 12 consists of a camera lens 13 or equivalent and a visual raster 14. The visual pattern 11 in the field of lens 13 is projected on to the visual raster 14, the visual raster being subdivided into incremental areas 15, and the amount light incident upon each incremental area 15 is defined as a property.

The classification unit 16 is a novel form of instrumentation for the basic classification technique as described in the before cited patent application, and as disclosed in that application, the classification process is merely an analog computation. This computation is performed by first subtracting a value from each of the derived property values, linearly transforming the resulting set of values, and finally comparing the sum of the squares of the transformed values with a threshold.

This classification process could be implemented by sensing the light incident upon each incremental area 15 of the visual 14 and then performing the required operation upon the resulting electronics signals. However, the number of electronic parts required may be substantially reduced if the required linear transformation is accomplished before the sensing operation as illustrated in FIG. 1B.

Referring to FIG. 1B, large optical fibers 17 are inserted into the visual raster 14 so that the face of each optical fiber can act as a light receiver. The amount of light incident upon each of the optical fibers is transmitted through the fiber to the vertical display unit 18 where the terminal face of each fiber acts as a light transmitter. The light from the vertical display unit 18 is transmitted to the horizontal array of photo sensors 19, each photo sensor 20 receiving light from all of the light transmitters of the vertical display unit as indicated by lines 21.

The light received from vertical display unit 18 is attenuated by passing through a photographic plate 22 located between the vertical display unit 18 and the horizontal array 19. As a consequence, by partially exposing the photographic plate at an appropriate location on the plate and then by developing the plate, a desired amount of light passing from the vertical display unit to any photo sensor in the horizontal array is attenuated.

By exposing the photographic plate at regions located along a vertical line 23 drawn across the plate, any desired linear combination of property values can be formed, and by forming an appropriate set of these linear combinations we can perform the desired linear transformation.

Having performed the required linear transformation as described in the copending J. W. Jones application, the appropriate mean values can be subtracted to derive the sum of squares of resultant values in circuit 24. The sum of squares from circuit 24 is compared to a threshold value as described in the J. W. Jones application to obtain a decision, in this case recognition of a pattern class 26.

The classification system described herein presents extremely simple and inexpensive implementation apparatus for recognizing visual patterns that are rotated, distorted, enlarged, shifted, or any combination thereof.

This is accomplished by linear transformation prior to the sensing operation, wherein the amount of light incident on a vertical display unit is attenuated by passing through a photographic plate partially exposed in a vertical direction prior to being detected by a horizontal array of photo sensors.

While I have described above the principles of my invention in connection with specific apparatus it is to be clearly understood that this description is made only by way of example and not as a limitation to the scope of my invention, set forth in the objects thereof and in the accompanying claims.

I claim:

1. Apparatus for a visual pattern recognition system comprising: means for developing a visual raster, including a lens for projecting said visual pattern onto said visual raster, said visual raster being subdivided into increments of area, the amount of light incident upon each of said increments of area being defined as a property; a vertical linear display and a plurality of optical fibers each arranged to transmit a corresponding one of said properties to a position along said vertical linear display; a horizontal array of light sensors placed to receive light from said vertical display; a light filter placed in the light path between said vertical display and said horizontal array of light sensors, said filter comprising a variable density translucent surface adapted for establishment of a variable predetermined light transmission pattern over said surface, whereby said sensors receive light attenuated by a predetermined factor as a function of the location of each property in said vertical display, thereby to effect a linear combination of said properties according to a predetermined combining function.

2. The invention defined in claim 1 further defined in that said filter is a photographic film pre-exposed and processed to provide said variable predetermined light transmission pattern.

3. The invention defined in claim 2 in which said predetermined light transmission pattern is provided as a physical analog of a linear transformation function in a substantially vertical direction.

References Cited

UNITED STATES PATENTS

| | | | |
|---|---|---|---|
| 3,104,324 | 9/1963 | Rabinow | 250—227 |
| 3,125,683 | 3/1964 | Stewart et al. | 250—227 |
| 3,225,329 | 12/1965 | Rabinow | 340—146.3 |
| 3,426,325 | 2/1969 | Partin et al. | 340—146.3 |

DARYL W. COOK, Primary Examiner

R. M. KILGORE, Assistant Examiner

U.S. Cl. X.R.

235—61.11; 250—219